Jan. 30, 1962   J. W. ANDERSON   3,018,500
WINDSHIELD WIPER BLADE
Filed Sept. 6, 1960
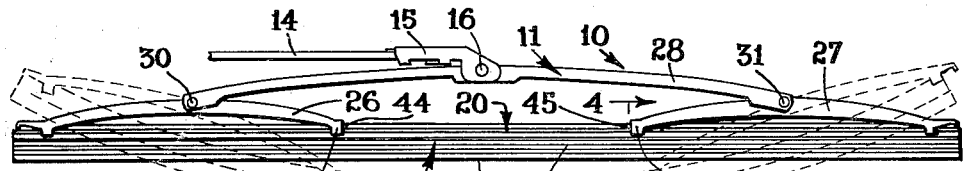
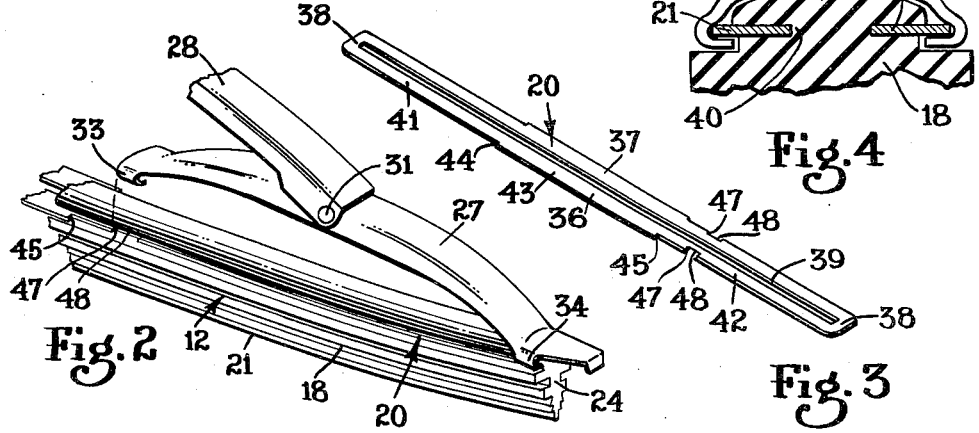
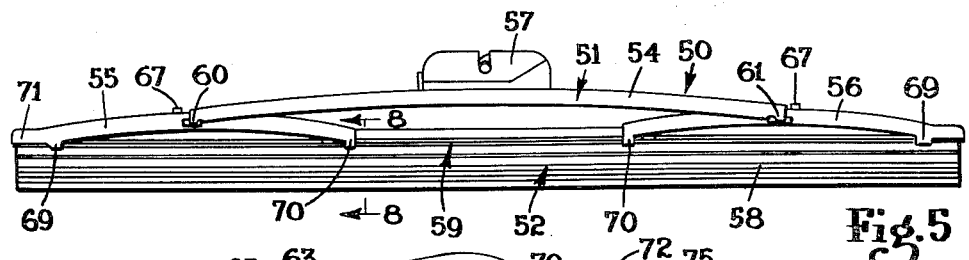
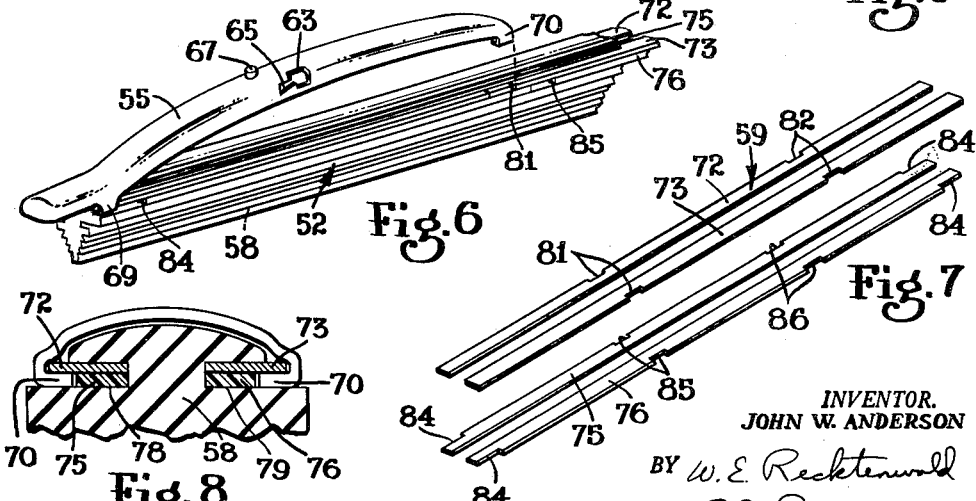
INVENTOR.
JOHN W. ANDERSON
BY W. E. Recktenwald
P. J. Rose
ATTORNEY United States Patent Office 3,018,500
Patented Jan. 30, 1962

3,018,500
WINDSHIELD WIPER BLADE
John W. Anderson, 578 Broadway, Gary, Ind.
Filed Sept. 6, 1960, Ser. No. 54,252
7 Claims. (Cl. 15—250.42)

This invention relates generally to windshield wiper blades and more particularly is directed to an improved wiper blade for wiping a curved or flat surface of a windshield.

Since the Second World War the trend of vehicle manufactures has been toward vehicles with curved windshields. One important step in making the curved windshield possible has been attributed to the windishield wiper blade invention shown and claimed in my U.S. Patent No. 2,596,063, issued May 6, 1952. Since use of said patented blade causes the rubber wiping element to go dead or harden from exposure to the sun and other conditions, it has been considered desirable to make the blade in such a way as to permit replacement of the wiping element. The present invention is directed primarily to novel means adapted to permit rapid and efficient assembly and disassembly of the pressure-distributing superstructure from the flexible backing member of the blade.

It is, therefore, a principal object of this invention to provide an improved means for assembling and disassembling the wiper blade from the pressure-distributing superstructure, which in some instances is not removable from the wiper arm.

It is another object of this invention to provide an improved means associated with the flexor or backing means that will facilitate ready removal of the blade from the pressure-applying superstructure, to permit substitution of a new rubber and flexor assembly to renew wiping capacity.

It is still another object of this invention to overcome certain disadvantages inherent in certain commercial forms of blades by facilitating assembly of the blade components and at the same time reducing the cost of manufacturing same.

A further object of this invention is to provide a wiper blade embodying novel principles of design and construction and a unique method of assembling the components of the complete blade assembly.

And a still further object of this invention is to provide an improved means for replacing the blade, comprising the rubber wiping element and the flexible backing means, that is relatively simple in operation, efficient in use and inexpensive to incorporate into an already existing device.

Another object of this invention is to provide an improved wiper blade assembly wherein substantially no metal parts are exposed to the windshield surface to scratch or mar same.

Other objects and advantages of the invention will become apparent after the description hereinafter set forth is considered in conjunction with the drawings annexed hereto.

FIGURE 1 is a side elevational view of a wiper blade assembly incorporating my invention with a second position of the blade shown in phantom;

FIGURE 2 is a partial perspective view of one end portion of the wiper blade of FIGURE 1;

FIGURE 3 is a perspective view of the backing strip showing part of my invention;

FIGURE 4 is a partial cross-sectional view taken along the lines 4—4 of FIGURE 1;

FIGURE 5 is a side elevational view of a modified form of wiper blade assembly incorporating my invention;

FIGURE 6 is a partial perspective view of one end portion of the wiper blade of FIGURE 5;

FIGURE 7 is a perspective view of the backing strip means of the blade of FIGURE 5; and FIGURE 8 is a partial cross-sectional view taken along the lines 8—8 of FIGURE 7.

Referring to the drawings wherein similar reference numerals refer to similar parts throughout the several views and more particularly to FIGURES 1–4 thereof, wherein a windshield wiper blade assembly is generally designated 10 and comprises a pressure-distributing superstructure 11 and a wiper blade 12. A windshield wiper arm 14 of conventional spring-urged construction is mounted on a pivot shaft (not shown) which has one end portion latched into a connector 15 pivotally carried on the pressure-distributing superstructure 11 by means of pivot pin 16 whereby pressure from the wiper arm 14 is transmitted to the wiper blade 12 for urging the wiping edge of said blade into conformity with the surface being wiped.

The wiper blade 12 is comprised of an elongate resilient wiping element 18 and an elongate resiliently flexible support or backing member 20 coactively associated with said wiping element. The wiping element 18 has a wiping edge 21 joined with a back portion 23 by a hinge 24.

The pressure-distributing superstructure 11 may be constructed in various ways but as herein illustrated preferably comprises a pair of corresponding secondary yokes 26, 27 having their ends connected to the backing member 20 of the wiper blade 12 and a primary yoke or bridge 28 having its ends pivotally connected by pins 30, 31, respectively, to the intermediate portions of the secondary yokes 26, 27.

Each secondary yoke 26, 27 has at its opposite ends inturned claws 33, 34 which claws are adapted to embrace the exposed side edge portions of the backing member 20 so as to apply pressure thereto and to the wiper element 18 at longitudinally spaced points. The claws 33, 34 are so constructed and arranged that they slide freely in a longitudinal direction within predetermined limits on said backing member whereby the wiper element is permitted to accommodate to the varying curvatures of the surface being wiped.

The backing member 20, best illustrated in FIGURE 3, is comprised of an elongate, preferably flat, resiliently flexible piece of material which is relatively flexible in one direction and is relatively inflexible in a plane perpendicular to said first-named direction. Said backing member 20 has a pair of corresponding side portions 36, 37 joined together by a connection or hinge 38 at each end to form a slot 39 therebetween in which is seated the narrow neck 40 of the back portion 23 of the resilient wiper element 18. The end portions 41, 42 of the backing member or support are reduced in width by comparison to the intermediate portion 43 to form abutments or shoulders 44, 45, respectively.

The end portion 42 has a pair of aligned notches 47 cut into the side edges thereof in spaced relationship longitudinally from the abutments 45. The base walls 48 of the notches 47 are spaced apart a predetermined distance such that the inner edges of the inboard claws 33 will pass easily between said base walls from either above or below said backing member 20.

To assemble the pressure-transmitting superstructure 11 with the wiper blade 12, the yoke 26 is threaded onto the reduced end portion 21 from its outer end thereon with the inner claws 33 abutting against the abutment 44 on said flexor. The wiper blade 12 is then bowed in a reverse direction such as shown in dotted lines in FIGURE 1 so that the outer claws 34 on the yoke 27 can be threaded onto the end or the reduced portion 42 of the flexor. The notches 47 are so positioned that the claws 33 are dropped through said notches so that when wiper blade 12 is returned to the substantially straight position of FIGURE 1 the claws 33 will embrace the side edges of the reduced end portion 42 in the vicinity of the abutments 45 of said flexor. The wiper blade 10 once assembled will function in every respect similar to the blade covered by my above-referred-to patented structure.

To remove the wiper blade 12 from the superstructure 11, the blade is once again reversely bent until the claws 33 on the yoke 27 become aligned with the notches 47 in the end portion 42 whereupon the inboard end of the yoke 27 is lifted from the backing strip with the claws 34 at the other end of yoke 27 manipulated so as to remove them longitudinally from the wiper blade and flexor member 20 whereupon the yoke 26 can be unthreaded from the portion 41 of the flexor 20. A new wiper blade element 12 can then be inserted in the assembly in the manner discussed above.

It is believed to be obvious that only one notch 47 instead of the two notches 47 shown need be formed in the end portion 42 of the flexor. In this way one claw 33 on yoke 27 is brought sideways into embracing relationship with the one edge of the flexor whereupon the other claw 33 is dropped down through or removed from the notch 47 whereupon the remaining assembly or disassembly of the superstructure 11 from the wiper blade 12 is affected. Whether the notches are formed in one or the other end portions of the flexor is immaterial. It is believed to be obvious that various modifications of the invention may be made such as employing different styles of superstructure 11, different style flexor or backing strips 20 and/or different styles of wiper elements 18 without departing from the broad scope of the invention.

FIGURES 5 through 8 show a modified form of my invention, wherein a windshield wiper blade assembly 50 is comprised of a pressure-distributing superstructure 51 and a wiper blade 52. The pressure-distributing superstructure 51 has a primary bridge member 54 operatively connected with a pair of secondary yoke members 55, 56. A connector 57 is carried by the bridge member 54 and is adapted to be connected to a windshield wiper arm in a conventional manner. The wiper blade 52 has a resilient windshield wiping element 58 and a flexible backing means 59.

The primary bridge 54 can be detachably connected to one or both of the secondary yokes 55, 56 by releasable connections. One typical releasable connection will be described for illustration but not by way of limitation. Each end of the primary bridge 54 is provided with a pair of inturned claws 60, 61 which are adapted to straddle each of the secondary yokes 55, 56 to pass downwardly into apertures 63 provided generally at approximately the center portion of the respective secondary yokes. The claws 60, 61 of the bridge are forced downwardly into the apertures 63 against the pressure of laterally extending springs (not shown) disposed in the apertures 63 and carried by the secondary yokes. After the claws 60, 61 depress the spring, the claws may be slid longitudinally into the slots 65 which communicate with the apertures 63 in the secondary yokes 55, 56. As soon as the claws pass into the slots 65, the springs snap into position relative to the apertures 63 behind the claws to prevent their accidental displacement from the assembled position. When, however, it is necessary to disassemble the bridge from the secondary yokes, the connection process is reversed and suitable buttons 67 are operatively associated through the backs of the secondary yokes and into contact with the free end of the spring such that downward pressure on the buttons will remove the spring from the apertures 63 so that the claws on the bridge can be slid from the slots 65 into the apertures 63 whereby the bridge can be disassembled from the secondary yokes.

Secondary yokes 55, 56 are adapted to be connected with the backing strip or flexor 59 by means of inwardly turned claws 69 and 70 on respective opposite ends thereof which are adapted to apply pressure to the blade at a plurality of spaced-apart points. The outer end portions of the secondary yokes 55, 56 are provided with a downturned hood or shroud 71 shaped to substantially encase the upper end portions of the blade 52.

The backing strip 59 is comprised of a pair of substantially planar, elongate side portions 72, 73 which generally may be made of metal or the like. The backing strip is adapted to be substantially flexible in one plane and to be substantially inflexible in a plane substantially perpendicular thereto. Positioned between one face of the backing strip 59 and the resilient wiping member is a pair of antifriction members 75, 76 made of material such as nylon or the like. The side portion 72 of the backing strip 59 is superimposed on the antifriction member 75 both of which are nested in a groove 78 formed in one side of the back portion of the resilient wiping element. Likewise, the side portion 73 and antifriction member 76 are nested in groove 79 in the other side of the back portion of the wiping element. Each side portion 72, 73 of the backing strip 59 has notches 81 and 82 formed in the outer side edge thereof spaced longitudinally inward from the respective ends of the backing strip. The pairs of notches 81 and 82 are spaced from the ends a distance slightly shorter than the length of the secondary yokes 55 and 56, respectively. Each notch 81, 82 is of a length slightly longer than the length of the claws 70 on the inner ends of the secondary yokes 55, 56.

The antifriction strips 75, 76 have notches 84 formed in the side edges at each end of each strip and have matching pairs of notches 85, 86 formed in the outer side edges spaced inwardly from the ends thereof. These last pairs of notches 85, 86 are spaced from the ends of the strip a distance substantially equal to the distance between the outer end of the secondary yokes 55, 56 and the claws 70 on the inner end of said secondary yokes. When the antifriction strips are superimposed with respect to the portions 72, 73 of the backing strip, the notches 81, 82 in the backing strip are positioned closer to the respective ends of the backing strip 59 and are longitudinally offset from the notches 85, 86 in the antifriction strips 75, 76, as best shown in FIGURE 6.

In assembling the wiper blade incorporating the backing strip 59 and antifriction strips just described, the wiping element 58 with the outwardly facing blind grooves 78, 79 in the back portion thereof is adapted to receive the superimposed side portion 72 of the backing strip and antifriction strip 75 in the groove 78 and the side portion 73 of the backing strip and antifriction strip 76 in the groove 79. The claws 69 on the outer end of the secondary yoke 55, as best shown in FIGURE 6, are threaded onto the end of the blade 58 with said claws 69 engaging around the end portions of the sides 72, 73 of the backing strip 59. The claws 69 nest in the notches 84 at the end of the antifriction strips 75, 76. The claws 70 on the inner end of the secondary yoke 55 are dropped through the notches 81 in the side portions 72, 73 of the backing strip 59, whereupon downward pressure on the claws 70 against the upper faces of the antifriction strips 75, 76 depresses the antifriction strips relative to the superimposed side portions 72, 73 of the backing strip 59. When the spacing between the antifriction strips 75, 76 and the backing strip 59 is great enough, the claws 70 and secondary yoke 55 are slid inwardly between the respective side portions 72, 73 and the antifriction strips 75, 76 until the claws 70 align with, and drop into, the notches 85 spaced inwardly from the ends of the blade.

The hood or shroud 71 of the secondary yoke 55 overlaps the ends of the side portions 72, 73 and antifriction strips 75, 76 to assist in helping to keep the backing strips and antifriction strips from threading out of the ends of the grooves 78, 79 of the wiping element 58. The superposition of the backing strip 59 over the notches 85 forms a cover for trapping the claws 70 in assembled position with the wiper blade. The secondary yoke 56 is assembled in the same manner as yoke 55 only with movement from the other direction and from the opposite end of the wiper blade by threading the claws 70 through the notches 82 into nesting position in notches 86. The bridge member 54 is assembled with the secondary yokes 55, 56 as described above so as to complete the assembly of the wiper blade. The wiper blade 52 can be disassembled for replacement purposes by first disconnecting the bridge 54 and then reversing the assembling steps of the secondary yokes 55, 56 relative to the wiper blade 52. The advantages in the use of antifriction strips as part of a wiper blade has been shown, described and claimed in my copending application Serial No. 696,444 filed November 14, 1957.

It is believed to be readily apparent that I have provided an improved means for readily assembling and disassembling a pressure-transmitting superstructure with a wiper blade so as to expedite replacement of wiper blades with a minimum loss of time to the service attendant and to the vehicle driver. The system used in assembly and disassembly is relatively simple and is substantially foolproof so that windshields are not likely to be scratched by improperly assembled blades.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A wiper assembly for cleaning a surface comprising a blade having an elongate flexible wiper element, an elongate resiliently flexible backing member connected to said wiper and flexible in unison therewith in a single plane, said backing member having a notch cut into a side edge thereof, and articulated pressure-distributing means connected to said blade at points adjacent the ends thereof and at at least one other point intermediate said ends, said point intermediate said ends being spaced from said notch in said backing member during normal use of the wiper assembly and being adapted to be aligned with said notch when said backing member is distorted away from said pressure means whereby said pressure means is removable from said blade.

2. A wiper assembly for cleaning a surface comprising a blade having an elongate flexible wiper element, an elongate resiliently flexible backing member connected to said wiper and flexible in unison therewith in a single plane, said backing member having a pair of notches cut into the opposite side edges thereof, and articulated pressure-distributing means connected to said blade at points adjacent the ends thereof and at points spaced inwardly from said ends, one pair of said points spaced inwardly from said ends being spaced from said notches in said backing member during normal use of the wiper assembly and being adapted to be aligned with said pair of notches when said backing member is distorted away from said pressure means whereby said pressure means is removable from said blade.

3. A wiper for cleaning a curved surface comprising an elongate blade flexible for conforming to the surface curvature, the blade having an elongate flexible backing strip, said backing strip having at least one notch formed in one side edge thereof, a pressure-transmitting superstructure extending lengthwise of said backing strip and having a bridge member with an arm attaching portion, means carried by said bridge member for connection with one end portion of said backing strip, and a secondary yoke connected intermediate its ends to the opposite end of the bridge member and having its opposite ends connected to the backing strip at longitudinally spaced points, at least one of said ends of said secondary yoke being movable into alignment with said notch in said backing strip whereby said superstructure is separable from said blade.

4. A wiper for cleaning a curved surface comprising an elongate blade flexible for conforming to the surface curvature, the blade having a resilient wiping element and an elongate flexible backing strip operatively associated therewith, said backing strip having a pair of notches formed in the side edges of one end portion of said backing strip, a pressure-transmitting superstructure extending lengthwise of said backing strip and having a primary yoke with an arm attaching portion, means carried by said primary yoke for connecting one end thereof to another end portion of said backing strip, and a secondary yoke connected intermediate its ends to the opposite end of said primary yoke and having its opposite ends connected to said first-named end portion of the backing strip at longitudinally spaced points, at least one of said ends of said secondary yoke being movable into alignment with said notch in said backing strip whereby said superstructure is separable from said blade.

5. A wiper for cleaning a curved surface comprising an elongate blade flexible for conforming to the surface curvature, the blade having an elongate flexible backing strip, one end portion of said backing strip having at least one notch cut into one side edge thereof, a primary yoke extending lengthwise of the strip and having an arm-attaching portion, a secondary yoke connected intermediate its ends to an end of the primary yoke and having its opposite ends connected to the backing strip at longitudinally spaced points, and another secondary yoke connected intermediate its ends to the opposite end of the primary yoke and having its opposite ends connected to the backing strip at longitudinally spaced points, at least one of said ends of one of said secondary yokes being movable into alignment with said notch in said backing strip whereby said primary and secondary yokes are separable from said blade.

6. A windshield cleaner comprising a primary pressure member provided with means for detachable connection with a driving member, supplemental pressure members coactively connected to said primary pressure member to receive pressure therefrom, a longitudinally disposed wiper blade having a backing means to which said supplemental pressure members are connected at a plurality of spaced-apart points thereon, at least one of said pressure points being remote from the extremities of said blade, said backing means being freely flexible in a single plane and being readily responsive to pressure at said points whereby said wiper blade may be pressed substantially into continuous contact with progressively varying contours of the surface to be wiped, said backing means having notch means formed in at least one side thereof so as to be normally misaligned with said pressure point remote from the extremities of the blade and so as to be aligned with said last-named pressure point during assembly and disassembly of said wiper blade from said pressure members.

7. A wiper assembly for cleaning a surface comprising a blade having an elongate flexible wiper element, an elongate resiliently flexible backing member connected to said wiper and flexible in unison therewith in a single plane, said backing member having notch means formed therein, and articulated pressure-distributing means connected to said blade at points adjacent the ends thereof and at at least one other point intermediate said ends, said point intermediate said ends being spaced from said notch means in said backing member during normal use of the wiper assembly and being adapted to be aligned with said notch means when said backing member is distorted away from said pressure means whereby said pressure means is removable from said blade.

References Cited in the file of this patent

UNITED STATES PATENTS 2,727,270    Bosso  ---------------- Dec. 20, 1955